United States Patent [19]

Sucher et al.

[11] 3,867,554

[45] Feb. 18, 1975

[54] YEAST GLYCAN AND PROCESS OF MAKING SAME

[76] Inventors: Robert William Sucher, 4597 Towne Centre, St. Louis County, Mo. 63128; Ernest Aleck Robbins, Box 429, Rt. 1, High Ridge, Mo. 63123; Daniel Robert Sidoti, 500 Welshire Ct., Ballwin, Mo. 63128; Erich Henry Schuldt, Jr., 9830 McKenzie Rd., St. Louis County, Mo. 63126; Robert Dudley Seeley, 8959 Larchwood Ct., Crestwood, Mo. 63011

[22] Filed: Nov. 29, 1972

[21] Appl. No.: 310,452

[52] U.S. Cl.............. 426/60, 426/148, 426/204, 426/212, 426/213, 426/364, 426/380, 426/431
[51] Int. Cl.............. A23j 1/18, A23l 1/28
[58] Field of Search ............ 426/60, 148, 364, 204, 426/212, 229, 213, 380, 431; 260/112 R

[56] References Cited
UNITED STATES PATENTS

| | | | |
|---|---|---|---|
| 3,268,412 | 8/1966 | Champagnat et al.............. | 195/3 |
| 3,585,179 | 6/1971 | Samejima et al.................. | 260/112 |
| 3,615,654 | 10/1971 | Ayukawa et al..................... | 99/9 |
| 3,634,194 | 1/1972 | Frankenfeld et al................ | 195/28 |
| 3,681,195 | 8/1972 | Suekane et al. ................... | 195/4 |
| 3,718,541 | 2/1973 | Kalina................................. | 195/28 |
| 3,725,075 | 4/1973 | Muroi et al. ....................... | 99/14 |

*Primary Examiner*—James R. Hoffman
*Attorney, Agent, or Firm*—Gravely, Lieder & Woodruff

[57] ABSTRACT

This application covers a yeast product which is derived from ruptured yeast cell walls and is known as yeast gum or yeast glycan. The yeast glycan is separated from the soluble parts of the yeast, purified, and dried. The yeast glycan increases the viscosity of aqueous fluids when rehydrated. The suspensions of yeast glycan also have a bland flavor, a "fat-like" mouth feel, and a sheen in appearance. Yeast glycan can be substituted for fat in certain dietary type food products, such as salad dressing, ice cream, etc.

16 Claims, 1 Drawing Figure

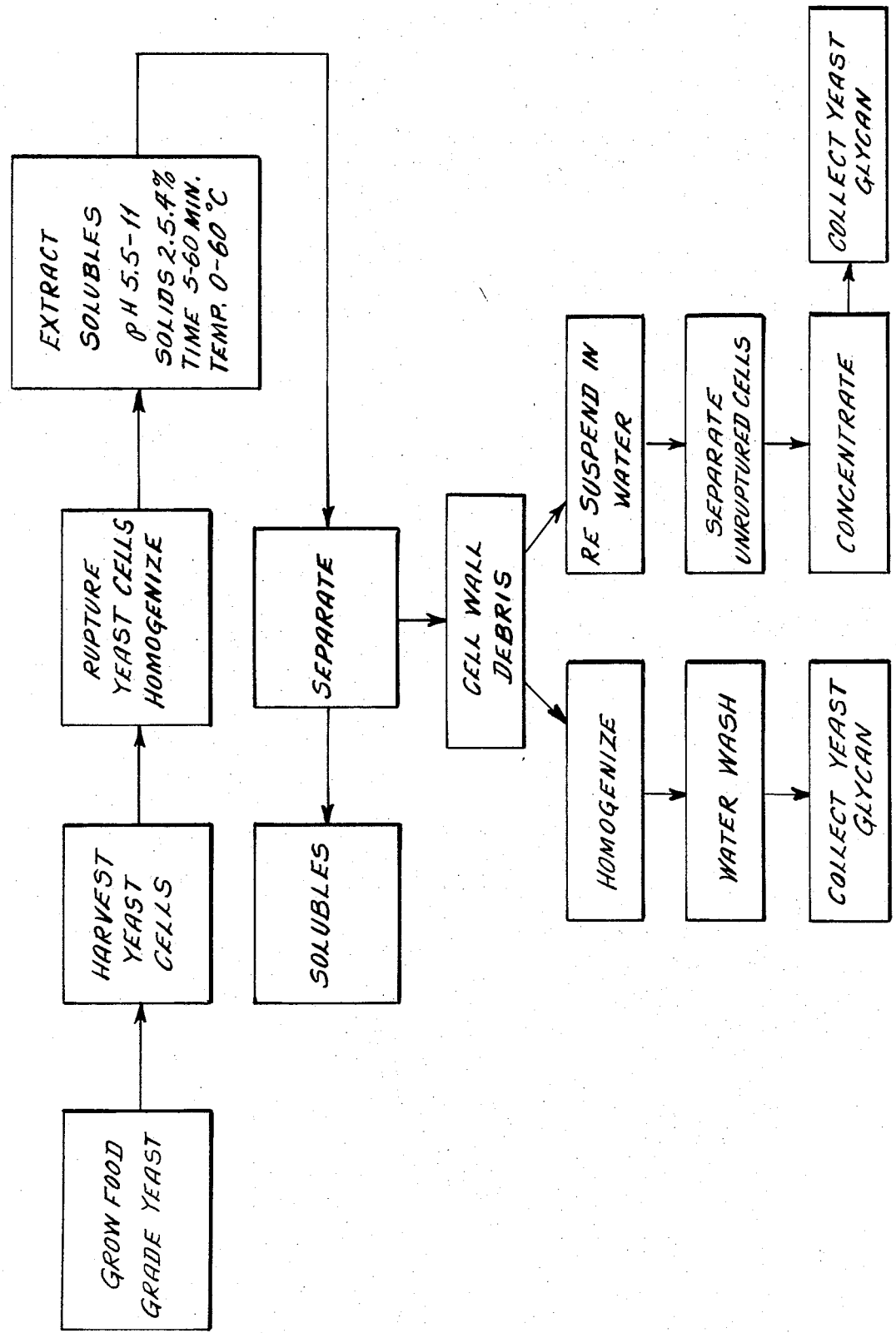

YEAST GLYCAN AND PROCESS OF MAKING SAME

BACKGROUND OF THE INVENTION

Yeasts, throughout history, have been used to leaven bread and to brew ale, beer and wines. In the 1930's, residual yeast from brewing operations and yeast produced as baker's yeast were dried and used for food purposes as a source of vitamins, minerals and protein. Dried food yeast contains approximately 33% to 40% true protein. In food usages, dried yeasts have been used at low levels in bread, cereals, peanut butter mixtures, other food products, and vitamin supplements as a source of protein, vitamins, minerals, and unknown nutrients. The levels of dried yeasts used in food products has never generally exceeded more than 5% because dried food yeasts have no functional values for food processing, and, at higher levels, contribute a distinct taste to the food product.

Yeast fractions have been used as a source of nutrients and are made from yeasts which have been autolyzed or whose cells have been broken up by mechanical means. In these cases, the protein has been recovered from the broken up yeast cells by alkaline extraction or solubilized by autolysis by the yeast enzymes themselves. These solubilized nutrients are then recovered by various methods. These commercial processes for recovering yeast protein and for producing yeast extracts all discard the extracted and washed yeast cell debris as a waste product.

We have discovered that the processing of food yeast to remove the major portion of the protein (as set forth in our copending application entitled YEAST PROTEIN ISOLATE WITH REDUCED NUCLEIC ACID CONTENT AND PROCESS OF MAKING SAME Ser. No. 310,469, filed Nov. 29, 1972) yields an insoluble residue consisting of a mixture of whole yeast cell walls, fragments of yeast cell walls, and some proteinaceous materials. This residue, when recovered by drying, yields a bland yeast product which has unique functional characteristics.

One of the primary functional characteristics of this yeast fraction is its ability to hold water and give thickening properties in aqueous food systems.

The cell wall debris is water washed to a relatively constant protein content and is composed of cell wall fragments and what appears to be whole cells containing a methylene blue stainable material. We call this mixture, which consists of cell walls and whole cells with methylene blue stainable material, yeast gum or yeast glycan. The whole cells with stainable material are in the smaller amount. It is not known whether these whole cells have the same cell composition as unprocessed yeast cells. The cells apparently have approximately the same crude protein content as the unprocessed cell.

We have further discovered that the addition of this yeast glycan to liquid food systems, in the proper proportions, gives the food product a "fat-like" mouthfeel even when these food products contain little or no fat. This is very useful in formulating low-calorie products, such as salad dressing, ice cream, puddings, sour cream based dips, etc.

We also have discovered that satisfactory yeast glycan preparations can be derived from not only the baker's yeast strains, such as *Saccharomyces cerevisiae*; but also from brewer's yeast strains, such as *Saccharomyces carlsbergensis*; a lactose utilizing food yeast, *Sacharomyces fragilis*; and strains of Candida such as *C. utilis*. *Saccharomyces fragilis* has recently been reclassified to *Kluyueromyces fragilis*. It has further been discovered that the yeast glycans can be derived from these various strains of yeast which have been grown on a variety of media. The glycans from different strains vary in some degree in their composition, but all have the ability to increase the viscosity of water when isolated by the process described in the invention.

It is known from the literature that yeast cell walls contain a yeast glucan with glucose linkages with a 1–6 main chain and 1–3 side chain. Yeast mannans having a structure consisting of a backbone of 1–6 mannopyranose units with 1–2 and 1–3 link side chains attached through the No. 2 carbon of the backbone also have been isolated from the cell walls. This yeast mannan has been isolated by autoclaving at pH 7 or heating in strong alkali to give the soluble mannan which is isolated as a copper complex. Chitin is another fraction isolated from yeast cell walls and it has 1–4 glucose linkages linked to N-acetylglucoseamine located near bud scars. The crude protein content of baker's yeast cell walls cited in the literature depends upon the method of preparation and usually falls between 5 and 20%.

Our product probably contains some or all of the foregoing constituents in addition to the unrefined portions previously discussed. All of these fractions in combinations give the unique properties and functions of our glycan.

We have discovered that when ruptured yeast cells are extracted with alkali, such as sodium hydroxide, and the residual cell debris washed thoroughly with water, a yeast food product is produced which can be dried by freeze drying, spray drying, drum drying or other methods of dehydration. This yeast fraction has a high level of carbohydrates, a low level of protein, a low but significant amount of lipid, and a low level of nucleic acid. It has been discovered that this yeast fraction can be incorporated in a variety of processed food products in place of lipid material and the food product will retain the excellent eating quality of a high-fat food product without the attendant calories of a high fat product.

The nucleic acid of yeast is mainly ribonucleic acid or RNA, and in this application these terms are used interchangeably.

DESCRIPTION OF DRAWING

The drawing is a schematic flow sheet of the process of this invention.

DETAILED DESCRIPTION

Our process is comprised of the following steps: production of yeast cells, rupture of the cells, separation of the insoluble cell wall fragments from the soluble cytoplasmic fraction, purification and conditioning of the glycan, vacuum concentration, and drying.

Yeast cells (biomass) is produced by methods known to those versed in the art. We preferably use biomass of strains of Saccharomyces and Candida grown on food grade nutrients in batch and continuous fermentation. However, the main considerations are that the yeast be of food grade and produced in good yield.

The biomass is harvested by centrifugation or filtration, and water washed. When necessary, dilute alkali may be incorporated in the wash to remove adhering color and taste bodies. The yeast cells are ruptured by any of several known methods, such as, high pressure homogenization, attrition in a sand or colloid mill, sonic disintegration, repeated freeze-thaw cycles, lytic enzymes, and the like. The main consideration is to rupture the majority of cells under such conditions that the majority of the non-glycan materials remain in the soluble state to facilitate from the glycan. The ruptured cell system (homogenate) may be diluted, warmed and pH adjusted to favor processability.

The homogenate is separated by centrifugation and/or filtration into a cell wall residue and an extract usually referred to as the alkali extract. A protein isolate and a meat flavored extract can be recovered from the alkali extract. The cell wall residue is processed to the yeast glycan.

Cell rupture, extraction of solubles, and processability are affected by pH, temperature, time, solids concentration, and homogenizer efficiency. Our usual method of measuring the extent of cell rupture is to determine the amount of nitrogen that remains soluble as follows:

% N Extractability = 100 × (g N in supernate after centrifugation/g N homogenate before centrifugation)

The yeast biomass after washing has a pH 4.5–6.5. The biomass is usually chilled, then passed through a Manton-Gaulin homogenizer to a chilled receiver. The process is repeated for a total of three passes. At least three passes are needed to obtain maximum cell rupture. In practice, the biomass was homogenized at the ambient pH of the yeast, namely 4.5–6.5. Cell rupture can also be achieved at higher pH's up to at least pH 9.5, but the subsequent separation of the cell wall residue from the solubles becomes more difficult.

The effects of pH, solids concentrations, and homogenizer efficiency upon the N extractability of *Candida utilis* and on *Saccharomyces cerevisiae* are shown in Table I and Table II.

The data of Tables I and II show that extraction of the soluble nitrogenous materials can be carried out at least over the pH range of about 5.5 to about 11. Process considerations further limit the extraction pH to the range of about 7 to about 10, with pH 9.5 considered the optimal balance between extraction and subsequent separation of the cell wall residue from the solubles. Extraction is best at a low solids content, but again a consideration of process rates led to the adoption of a solids content of about 2.5 to about 4%. Extraction time can be varied between about 5 and about 60 minutes at extraction temperature of about 0°C. to about 60°C. preferably 25°–60°C. The best process rate of the subsequent separation of the cell wall residue from the solubles are obtained when the extraction is done at 60°C. for 5 to 20 minutes, at pH 9.5. With *Candida utilis* and *Saccaromyces cerevisiae*, each pass from 1 to 5 through the homogenizer improves the nitrogen extractability presumably by rupturing more cells. A three pass system has been adopted as a good balance between efficiency of processing and cost. The pressure is between 5,000 and 15,000 PSIG. The temperature is between 0° and 60°C. The pH is 4.5 to 6.5.

Taking N extractability and processing requirements into consideration, the optimal process to obtain the insoluble cell wall material is (1) growing a food grade yeast on a nutrient media, (2) harvesting and washing the yeast cells, (3) rupturing the yeast cells at a temperature of 0°–10°C., (4) handling the ruptured cells at a pH 9.5, at 60°C. for 20 minutes and (5) removing the yeast insolubles at a temperature of about 60°C. The extract containing the soluble part of the yeast is called the alkali extract. Under the optimal conditions, 85–90% of the Kjeldahl N of the homogenate is obtained in the alkali extract. The highest N extractability will result in the lowest protein content of the glycan.

TABLE I

Effect of Extraction pH, Solids Level, and Homogenizer Efficiency Upon Nitrogen Extractability of *Candida utilis*

Chilled suspensions of *Candida utilis* at pH 5.0–5.5, 7–10% solids were homogenized by means of Manton-Gaulin homogenizer. The chilled homogenate was recycled through the homogenizer repeatedly to give one, two, three or four pass homogenate. The homogenate was diluted with up to 2.0 parts of water, and adjusted in pH. The diluted homogenates were incubated for 30 min. at 50°C. and then centrifuged. The nitrogen contents of the diluted homogenate, and of the supernate were measured by the Kjeldahl method. % N extractions were calculated.

| pH of Extraction | Solids Content | No. of Passes | % Nitrogen Extracted |
|---|---|---|---|
| 7 | 2.5 | 3 | 76* |
| 8 | 2.5 | 3 | 74* |
| 9 | 2.5 | 3 | 84* |
| 10 | 2.5 | 3 | 82** |
| 11 | 2.5 | 3 | 80** |
| 9.5 | 2.5 | 1 | 70* |
| 9.5 | 2.5 | 2 | 83* |
| 9.5 | 2.4 | 3 | 89* |
| 9.5 | 2.5 | 4 | 91* |
| 9 | 2.4 | 3 | 83* |
| 10 | 2.4 | 3 | 82** |
| 11 | 2.4 | 3 | 78** |
| 12 | 2.4 | 3 | 85** |
| 9 | 6.9 | 3 | 64** |
| 10 | 6.9 | 3 | 59*** |
| 11 | 6.9 | 3 | 54*** |
| 12 | 6.9 | 3 | 41*** |

Good (*), Medium (), or Poor (*) separation of cell wall residue and solubles.

TABLE II

Effect of Extraction pH, Temperature, Time, Solids Content, and Homogenizer Efficiency Upon the Nitrogen Extractability of *Saccharomyces cerevisiae*

Chilled suspensions of commercial baker's yeast at ambient pH of 6–6.5, 7–10% solids, were homogenized by means of a Manton-Gaulin homogenizer. The chilled homogenate was recycled through the homogenizer to give one, two or three passes. The homogenates were diluted with up to two volumes of water and adjusted in pH. The diluted homogenates were incubated for 5–60 minutes at 25–60°C. and centrifuged. The nitrogen contents of the homogenates and supernates after centrifugation were measured by the Kjeldahl method. % N extractions were calculated.

| pH | % Solids Content | Time (min.) | °C. emp. | Number of Passes | % Nitrogen Extractability |
|---|---|---|---|---|---|
| 9.5 | 9.1 | 30 | 25 | 3 | 83 |
| 9.5 | 4.8 | 30 | 25 | 3 | 84 |
| 9.5 | 3.1 | 30 | 25 | 3 | 92 |
| 9.5 | 3.1 | 30 | 25 | 2 | 80 |
| 9.5 | 3.1 | 30 | 25 | 1 | 63 |
| 9.5 | 3–4 | 5 | 50 | 3 | 91 |
| 9.5 | 3–4 | 20 | 50 | 3 | 93 |
| 9.5 | 3–4 | 30 | 50 | 3 | 96 |
| 9.5 | 3–4 | 60 | 50 | 3 | 96 |
| 9.5 | 3–4 | 5 | 60 | 3 | 93 |
| 9.5 | 3–4 | 20 | 60 | 3 | 94 |
| 9.5 | 3–4 | 30 | 60 | 3 | 91 |
| 9.5 | 3–4 | 60 | 60 | 3 | 90 |
| 4.0 | 3–4 | 30 | 25 | 3 | 33 |
| 5.0 | 3–4 | 30 | 25 | 3 | 36 |
| 6.0 | 3–4 | 30 | 25 | 3 | 79 |
| 7.0 | 3–4 | 30 | 25 | 3 | 93 |

TABLE II-Continued

Effect of Extraction pH, Temperature, Time, Solids Content, and Homogenizer Efficiency Upon the Nitrogen Extractability of *Saccharomyces cerevisiae*

Chilled suspensions of commercial baker's yeast at ambient pH of 6–6.5, 7–10% solids, were homogenized by means of a Manton-Gaulin homogenizer. The chilled homogenate was recycled through the homogenizer to give one, two or three passes. The homogenates were diluted with up to two volumes of water and adjusted in pH. The diluted homogenates were incubated for 5–60 minutes at 25–60°C. and centrifuged. The nitrogen contents of the homogenates and supernates after centrifugation were measured by the Kjeldahl method. % N extractions were calculated.

| pH  | % Solids Content | Time (min.) | °C. Temp. | Number of Passes | % Nitrogen Extractability |
|-----|------------------|-------------|-----------|------------------|---------------------------|
| 8.5 | 3–4              | 30          | 25        | 3                | 93                        |
| 9.5 | 3–4              | 30          | 25        | 3                | 96                        |
| 6.0 | 3–4              | 60          | 60        | 3                | 42                        |
| 6.5 | 3–4              | 60          | 60        | 3                | 33                        |
| 7.5 | 3–4              | 60          | 60        | 3                | 30                        |
| 8.5 | 3–4              | 60          | 60        | 3                | 73                        |
| 9.5 | 3–4              | 60          | 60        | 3                | 90                        |

The cell wall residue is purified by water washes, or by homogenization and water washes followed by centrifugation to separate the unruptured cells. The glycan is usually concentrated in vacuo to provide economy of drying to a powder by spray drying, drum drying and the like. An added benefit of the in vacuo concentration is the removal of trace yeastly flavor to provide a bland product. The in vacuco concentration is important where the cell wall residue is not homogenized prior to washing. The conditions of in vacuo drying are as follows: Time 10 to 60 min.; Temp. 120°F. to 200°F., Vacuum: 20 to 28 inches Hg.; Concentration Factor: 5% to 20% solids.

The final yeast glycan product has a composition of about 5–20% crude protein, about 0.1–3% lipid, about 1–3% nucleic acid, about 0.5–3% ash, and from about 60–95% carbohydrate. The yeast glycan produces a viscosity of at least about 500 centipoises when suspended in a 10% aqueous solution by weight at a temperature of 25°C. The yeast glycan produced from homogenized yeast has an average fragment size of about 3.8±0.8 by about 2.4± 0.7 microns. It is composed principally of irregularly shaped fragmented cells and cell walls (from about 70 to about 100%) with a lesser amount (from about 0 to about 30%) of whole cells containing methylene blue stainable material.

Physical characteristics of our yeast glycan product were determined when suspensions of 5% yeast glycan (lot 091146) in water were inspected microscopically and photographed.

Photomicrographs were prepared under the following conditions: Heine Phase contrast, dark field setting, 40 × phase objective, green filter, light at 6A, 1/2 second exposure, magnification 500 × x, Polaroid type 107.

Examination of the mounts and of the photomicrographs reveal that: yeast glycan is composd almost entirely of pieces of cell walls of irregular shape and form. Some unfractured cells are visible, and these unfractured cells appear similar to baker's yeast cells. Empty cells, that is, cells whose outer boundaries are visible and unbroken but which appear devoid of cytoplasma within the cell outline are not present.

In the following Table, Table III, yeast biomass was prepared in fermentations by processes known to those versed in the art. The yeast biomass was harvested by centrifugation and washed twice with water. The yeast cells were ruptured by means of a Manton-Gaulin high pressure homogenzier. The ruptured cells and cell wall fragments were harvested by differential centrifugation and constitute the unrefined yeast glycan. The unrefined yeast glycan contains cytoplasmic constituents that can be removed by washing. The progress of the purification of the yeast glycan is followed by measuring the protein content. The effect on the protein content and on product yield of subjecting the unrefined yeast glycan to repeated washing is shown in Table III. An alternative method of purification is to rehomogenize the cell wall debris prior to washing. This method will be described in more detail hereinafter.

TABLE III

Purification of Yeast Glycan by Repeated Water Washing

| Source of Yeast Glycan | Protein Content of Yeast Glycan (1) in grams on dsb. No. of Washes | | | | | Yield (2) in % No. of Washes | | | | |
|---|---|---|---|---|---|---|---|---|---|---|
| | 1 | 2 | 3 | 4 | 5 | 1 | 2 | 3 | 4 | 5 |
| *Saccharomyces cerevisiae*[3] | 18 | 14 | 13 | 13 | | 16 | 15 | 14 | 14 | |
| *Saccharomyces carlsbergensis*[4] | 26 | 26 | 24 | 23 | | 27 | 26 | 22 | 21 | |
| *Saccharomyces fragilis*[5] | 23 | X | X | X | 9 | 25 | X | X | X | 9 |
| *Candida utilis* Y-900[3] | 21 | 13 | 13 | 13 | 12 | 11 | 9 | 8 | 7 | 6 |
| *Candida utilis* Y-1084[3] | 27 | 18 | 15 | 15 | 14 | 16 | 14 | 13 | 13 | 12 |

[1] Kjeldahl N × 6.25 (dry solids basis)
[2] Yield = 100 × g solids recovered as yeast glycan/g initial yeast solids
[3] Grown in batch fermentation using molasses as a carbon source.
[4] Brewers yeast recovered after fermentation of wort.
[5] Grown in batch fermentation using milk whey as a carbon source.

The washed yeast glycan can be recovered after washing by various methods of drying such as spray drying, drum drying or lyophilization. The composition of the lyophilized yeast glycans obtained after 4–5 water washes is shown in Table IV.

TABLE IV

Composition of Washed Yeast Glycan

| Source of Glycan or gum | Carbohydrate | Protein[1] | Lipid | Ash | Nucleic[2] Acid | Ratio[3] G/m |
|---|---|---|---|---|---|---|
| *Saccharomyces cerevisiae* | 84.8 | 10.5 | 1.5 | 1.3 | 1.9 | 3:2 |
| *Saccharomyces carlsbergensis* | 71.2 | 19.5 | 2.7 | 3.8 | 2.8 | 1:1 |

TABLE IV – Continued

Composition of Washed Yeast Glycan

| Source of Glycan or gum | Carbohydrate | Protein[1] | Lipid | Ash | Nucleic[2] Acid | Ratio[3] G/m |
|---|---|---|---|---|---|---|
| *Saccharomyces fragilis* | 81.2 | 13.5 | 2.6 | 0.8 | 1.9 | 3:2 |
| *Candida utilis* Y-900 | 84.4 | 9.8 | 2.1 | 1.6 | 2.1 | 3:2 |
| *Candida utilis* Y-1084 | 84.4 | 11.1 | 1.3 | 0.8 | 2.4 | 3:2 |

[1] % Protein = 6.25 (% Kjeldahl N - % Nucleic Acid N).

[2] Nucleic Acid determination: About 50 mg. sample is digested with 5 ml. of 0.2 N KOH for 30 minutes at 100°C. The digest is acidified with 5 ml. $HClO_4$ citrate reagent (0.4 M citrate buffer, pH 2.2 containing 1.7 ml., 70% $HClO_4$ per 100 ml.). The residue is removed by centrifugation. The $A_{260}$ of the suitably diluted supernatant is measured. The extinction coefficient of 31.7 $A_{260}$ ml/mg. is used to calculate RNA. The RNA content is corrected for the $A_{260}$ contribution of protein fragments in the hydrolysate as measured by the Lowry method.

[3] The ration of glucose to mannose (G/m) of the glycan was established by quantitative determination of the sylated monosaccharides formed on acid hydrolysis.

The yeast glycans rehydrate to viscous suspensions which have suspension freeze-thaw stability, and are capable of conferring a full-fat mouth feel despite the absence of fat in the yeast glycan and in the food formulation. The ability to form viscous suspensions is shown in Table V.

TABLE V

Viscosity of Yeast Preparations

The viscosity of a 10% suspension of lyophilized yeast glycans was measured at pH 7, 25°C. using a Brookfield LVT, Helipath Stand, Spindle TE at 12 rpm.

| Source of Yeast Gum | Centipoise After Rehydrating at pH 7, 25°C. | | | |
|---|---|---|---|---|
| | 1Hr. | 2Hr. | 4Hr. | 24Hr.[1] |
| *Saccharomyces cerevisiae* | 800 | 2300 | 4400 | 6000 |
| *Saccharomyces carlsbergensis* | 11900 | 11000 | 10400 | 10900 |
| *Saccharomyces fragilis* | 8600 | 9100 | 11000 | 13200 |
| *Candida utilis* Y-900 | 3800 | 4000 | 5400 | 5300 |
| *Candida utilis* Y-1084 | 1250 | 3250 | 6650 | 7650 |

[1] Refrigerated overnight, then warmed to 25°C.

The laboratory preparation of yeast glycan from the yeast strain, *Saccharomyces fragilis* is presented in Example No. 1.

EXAMPLE NO. 1

Preparation of Yeast Glycan from *Saccharomyces fragilis*.

Preparation of Biomass:

A primary growth stage was prepared as follows: Dry cheddar cheese whey at a concentration of 40 grams per liter of potable water was heated at 121°C. For 5 minutes to produce a proteinaceous coagulum. The coagulum was removed by filtration. The liquid fraction is called whey. Per liter of filtered whey solution the following were added: ammonium sulfate, 5.0 g.; dipotassium phosphate, 5.0 g.; yeast extract powder, 1.0 g. The reaction was adjusted to pH 5.4 by the addition of sulfuric acid. The broth was dispensed in Fernback flasks fitted with baffles in 1 liter volumes and sterilized in the autoclave. This primary stage was inoculated with 10 ml. of a glucose peptone yeast extract broth culture of *Saccharomyces fragilis* Y-1109. The primary stage was incubated for 3 days by revolving on a rotary shaker at 112 RPM with a 4 inch eccentric throw at 30°C.

Primary stage yeast equivalent to 5.0 g. dry substance was used to stock Stage 1 in a small fermentor. The stock yeast was added to 3.2 liters of potable water. Immediately a liquid feed stock containing the following was supplied to the yeast in the fermentor. Feed stock composition per liter; rehydrated dry cheddar cheese whey which had been heated and filtered to clarity, equivalent to 150 g. lactose; ammonium sulfate, 36.2 g.; 85% phosphoric acid, 24.5 ml. The volume was made to 1 liter with potable water. This liquid feed stock was supplied completely and continuously during 11 hours at an increasing rate of 1.14. The yeast growth broth was maintained at pH 5.7 by use of alkali. The yeast growth broth temperature was 30°C. Aeration by sparger and impellor was at a rate of 3 volumes air per volume of growth broth per minute.

Stage 1 produced yeast dry substance equivalent to 32% of the lactose supplied. This Stage 1 yeast contained 7.7% and 1.5% P.

Stage 2 was stocked with 16.4 g. dry substance equivalent of Stage 1 yeast. The stock yeast was added to 3.2 liters of potable water. Stage 2 was carried out in the same manner as Stage 1. Stage 2 produced dry substance yeast equivalent to 37% of the lactose supplied. The Stage 2 yeast contained 7.03% N and 1.52% P.

Preparation of Yeast Glycan

The cells were harvested and washed by centrifugation. The cells contained in 750 ml. of slurry at 11.8% solids were ruptured at 15°C. by three passes through a Manton-Gaulin homogenizer at 8–10,000 psig. The homogenate was adjusted to pH 9.5 with sodium hydroxide, diluted to 5.9% solids and held for 30 minutes at 15°C. Upon centrifugation of the homogenate, the insoluble solids were deposited in two layers. The upper layer constitutes the unrefined yeast glycan, the lower layer contains unruptured cells and some yeast glycan. The lower layer was resuspended in 200 ml. water and centrifuged to again form two layers. The upper layer was harvested and combined with the previous upper layer. The combined upper layers were repeatedly washed with 200 ml. portions of water. The results of the washing are presented in Table III. The washed yeast gum was lyophilized to a dry powder. The analysis of the dry powder is presented in Table IV. The rehydration-viscosity characteristics are presented in Table V.

EXAMPLE NO. 2

Preparation of Yeast Glycan from *Candida utilis*.

Preparation of Biomass:

The yeast *Candida utilis* Y-1084 was inoculated into 10 ml. of sterile glycose peptone yeast extract broth and incubated 2 days at 30°C. This broth culture was used to inoculate 1 liter of sterile molasses broth of the following composition; clarified cane molasses reducing substance equivalent by Munson Walker gravimetric method, 30.0 g.; ammonium sulfate, 4.55 g.; diammonium phosphate, 0.68 g.; potassium sulfate, 0.20 g.; magnesium heptahydrate, 60 mg. The 1 liter of molasses broth was contained in a 4 liter Ehrlenmeyer flask. The reaction was adjusted to pH 5.2 by the addition of sulfuric acid before sterilization in the autoclave. This molasses broth growth stage was called the primary stage. After inoculation it was incubated for 3 days at 30°C. on a rotary shaker revolving at 112 RPM with a 4 inch eccentric throw.

Primary stage yeast growth equal to 5.0 g. dry substance yeast was used to stock a small fermentor containing 3.2 liters of potable water. This was called Stage 1. Immediately, a liquid feed was supplied to the water suspension of yeast. The liquid feed comprised two solutions. Solution 1 contains 150 g. clarified cane molasses reducing substances equivalent by Munson Walker gravimetric method diluted to 1 liter with potable water. Solution 2 contained 29.9 ml. of 29% ammonia, 12.8 g. ammonium sulfate, and 2.58 ml. of 85% phosphoric acid in a volume of 1 liter potable water. The liquid feed was delivered continuously for 11 hours at an hourly increasing rate of 1.14. The temperature of the growth broth was 35°C. Aeration was provided at a rate of 3 volumes air per volume of growth broth per minute using a sparger and impellor system. The reaction was maintained at pH 5.0-7.0.

Stage 1 produced yeast dry substance equivalent to 54.3 percent of the molasses provided. This Stage 1 yeast contained 8.69% N and 1.3% P.

Stage 1 yeast was used to stock Stage 2. Stage 2 liquid feed comprised two solutions. Solution 1 contained 150 g. clarified cane molasses reducing substances equivalent by Munson Walker gravimetric method. Solution 2 contained 33.3 ml. 29% ammonia, 17.3 g. ammonium sulfate, and 3.34 ml. of 85% phosphoric acid. Stage 2 was stocked with 16.4 g. d.s. of Stage 1 yeast by adding the Stage yeast to 3.2 liters of potable water contained in a small fermentor. The liquid feed was delivered immediately and continuously for 11 hours at an hourly increasing rate of 1.14. The reaction of the growth broth was between 5.5 and 6.8. The growth broth temperature was 35°C. Aeration was provided at a rate of 3 volumes of air per volume of growth broth using a sparger and impellor system.

Stage 2 produced yeast dry substance equivalent to 45% of the weight of the clarified cane molasses reducing substance supplied. The Stage 2 yeast contained 8.03% N and 1.12% P.

EXAMPLE NO. 3

Preparation of Yeast Glycan from *Saccharomyces carlsbergensis*.

*Saccharomyces carlsbergensis* (brewers yeast) was obtained as a by-product of the brewing operation at the St. Louis, Miss. plant of Anheuser-Busch, Incorporated. The cells were washed three times with water.

The cells contained in 400 ml. of slurry at 4.3% solids were ruptured at 15°C. by three passes through a Manton-Gaulin homogenizer at 8000 psig. The homogenate was adjusted to pH 9.5 with sodium hydroxide, and held for 30 minutes at 15°C. Upon centrifugation of the homogenate, the insoluble solids were deposited in two layers. The upper layer, which constitutes the unrefined yeast glycan, was harvested, and the lower layer, which contains unruptured cells and some yeast glycan, was resuspended in 200 ml. of water and centrifuged to again form two layers. The upper layer was harvested and combined with the previous upper layer. The combined upper layers were repeatedly washed with 200 ml. portions of water. The results of the washing as presented in Table III. The washed yeast gum or glycan was lyophilized to a dry powder. The analysis of the dry powder is presented in Table IV. The rehydration viscosity characteristics are presented in Table V.

EXAMPLE NO. 4

Preparation of Yeast Glycan from *Candida utilis*

1,300 grams each of *Candida utilis* Y-900 and Y-1084, pH 6, at 7.5 and 6.0% solids respectively were ruptured at 15°C. by three successive passes through a Manton-Gaulin homogenizer at 8,000 psig. The homogenates were adjusted to pH 9.5 with sodium hydroxide and held for 30 minutes at 15°C. Upon centrifugation of the homogenate, the insoluble solids were deposited in two layers. The upper layer constitutes the unrefined yeast glycan, the lower layer contains unruptured cells and some yeast glycan. The lower layer was resuspended in 200 ml. water and centrifuged to again form two layers. The upper layer was harvested and combined with the previous upper layer. The combined upper layers were repeatedly washed with 200 ml. portions of water. The results of the washing are presented in Table III. The washed yeast glycan was lyophilized to a dry powder. The analysis of the dry powder is presented in Table IV. The rehydration-viscosity characteristics are presented in Table V.

EXAMPLE NO. 5

Preparation of Yeast Glycan From *Saccharomyces cerevisiae*.

Baker's yeast (*Saccharomyces cerevisiae*) was grown in aerated batch culture on a combination of beet and cane molasses using suitable nutrients and nitrogen sources in accordance with Example No. 2 except that *Saccharomyces cerevisiae* was used. Final yeast concentration was 30 grams per liter dry solids yeast. The yeast was separated from the beer by centrifugation and was subsequently given three water washes and thickened to 11% solids by weight.

Fifty gallons of this suspension containing 46 pounds of yeast solids were cooled to 45°F., subjected to homogenization at a pressure of 8,000 PSIG, and cooled to 45°F. The homogenization procedure was repeated for a total of three passes. The homogenate was diluted to a volume of 150 gallons with water. A food grade alkaline reagent (sodium hydroxide) was added until a pH of 9.5 was reached. The material was agitated for 15 minutes, and then centrifuged. The alkali extract, which contained 31 pounds of dry solids, was discarded. The centrifuge sludge, which contained 16 pounds of dry solids, was diluted to 90 gallons with water and additional sodium hydroxide was added until a pH of 9.5 was reached. The slurry was agitated for 15 minutes, and then centrifuged. The alkali washings which contained 5 pounds of dry solids, was discarded. The centrifuge sludge contained 11 pounds of dry solid which was comprised essentially of whole yeast cells and cell wall fragments. The washed sludge was diluted to 34 gallons with water. A food grade acid reagent, hydrochloric acid, was added until a pH of 6.5 was reached. The suspension was separated on a disc centrifuge operated in a flooded condition to yield 6 pounds (dab) of an underflow of which consists principally of whole cells and a minor amount of cell wall fragments, and 5 pounds (dsb) overflow which consists principally of cell wall fragments and a very minor amount of whole cells. The overflow was vacuum concentrated on a plate evaporator and flask dried in a spray dryer to 7.9 percent moisture.

Product analysis was as follows:

| | |
|---|---|
| % Carbohydrate, dsb | 80.4 |
| % Crude protein, dsb | 15.0 |
| % Total nucleic acid, dsb | 2.8 |
| % Lipid, dsb | 0.8 |
| % Ash, dsb | 3.8 |

The viscosity of the rehydrated glycan is a function of several variables. Examples of these variables are (1) method or processing to obtain the dried glycan, (2) dehydration time, (3) rehydration temperature, (4) rehydration pH, and (5) the concentration of the glycan.

The effect of processing technique upon the viscosity of the rehydrated glycan and the effect of rehydration pH are shown in Table VI.

EXAMPLE NO. 5A

Preparation of Yeast Glycan from *Saccharomyces cerevisiae*

Commercial baker's yeast was processed according to Example No. 5 to obtain the centrifuge sludge and alkali extract. The centrifuge sludge is further processed by homogenization and washing. The centrifuge sludge (15 gallons) was diluted with an equal volume of water, and cooled to 45°F., and homogenized at 8,000 PSIG in a Manton-Gaulin homogenizer. The homogenate was recycled with intermediate cooling to 45°F. for a total of three passes. The homogenate was diluted to 30 gallons with water, adjusted to pH 9.5 by the addition of sodium hydroxide and centrifuged to a supernate and a residue. This residue was suspended to a total of 45 gallons and centrifuged to constitute one wash. The residue was washed again. The twice washed residue was adjusted to pH 5.3 by the addition of hydrochloric acid and spray dried.

The composition of the spray dried glycan was (dsb): 92.5% carbohydrate, 6.3% crude protein, 2.0% nucleic acid, 0.9% ash, and 0.3% lipid.

TABLE VI

The Effect of a Process Variable Upon the Viscosity of Rehydrated Glycan

Example No. 5 shows the large scale preparation of yeast glycan. At a point in the preparation, the centrifuged sludge is diluted, adjusted to pH 9.5, agitated for fifteen minutes, and then centrifuged. If the fifteen minute time period is prolonged, then the spray dried glycan subsequently obtained has a markedly increased viscosity after rehydration. The spray dried glycans were made to a 10% W/W suspension at 25°C., and rapidly adjusted to pH 3, 5, 7 and 9. The viscosity was measured with time.

| | Process Holding Time | Maximum Viscosity (cps) of a 10% W/W Suspension Measured at 25°C., at the noted rehydration pH. | | | |
|---|---|---|---|---|---|
| Sample | 40°F, pH 9.5 | pH 3 | pH 5 | pH 7 | pH 9 |
| 09:127 A | 36 hours | 31,800 | 41,800 | 50,500 | 37,800 |
| 09:127 B | 30 hours | 23,000 | 33,800 | 34,500 | 24,700 |
| 09:127 C | 3 hours | 8,800 | 13,800 | 12,300 | 10,400 |

The hold time may be at pH about 9.5 to about 10.0, preferably about pH 9.5, for about 3 to about 30 hours, at a temperature of from about 40°F. to about 122°F.

If the hold time is used in the process involving rehomogenization of the yeast glycan cell wall debris, it occurs after homogenization and before washing or drying.

Glycan preparations from the various strains of yeast may or may not show an effect of pH upon viscosity as noted in Table VII.

TABLE VII

The Effect of pH on the Viscosity of Yeast Glycan Preparations

Yeast glycan was prepared from various strains of yeast in accordance with the procedures described in the Examples except that the samples were not subjected to freeze drying or spray drying. These yeasts glycan sludges were adjusted to pH 3, 5, 7 and 9, carefully diluted to 10% W/W solids, and incubated at 25°C. The viscosity was measured periodically over a four hour period to obtain the maximum viscosity using a Brookfield LVT, Helipath Stand, Spindle TE at 12 rpm.

| | Viscosity (cps), 25°C. | | | |
|---|---|---|---|---|
| Source of Glycan | pH 3 | pH 5 | pH 7 | pH 9 |
| *Saccharomyces cerevisiae* | | 7,700 | 7,200 | |
| *Saccharomyces carlsbergensis* | | 21,000 | 18,900 | |
| *Candida utilis* Y-900 | 8,100 | 9,300 | 8,800 | 9,300 |
| *Candida utilis* Y-1084 | 9,400 | 10,700 | 12,900 | 13,300 |

The temperature of rehydration markedly affects the viscosity of a glycan preparation as noted in Table VIII.

ken yeast cells were decreased by rehomogenization passes, which in turn allows yeasty flavor to be totally

TABLE VIII

Effect of Rehydration Concentration & Temperature Upon Viscosity

To 2.5, 5, 10, and 20 gram samples of baker's yeast glycan prepared in accordance with Example No. 4 was added water at 25°C. or 95°C. to make 100 grams. The samples were stirred to provide adequate suspension. The 25°C. sample was set in a 25°C. bath. The 95°C. sample was capped and set in a boiling water bath for five minutes, then transferred to a 25°C. bath. When the 95°C. had reached 25°C., its viscosity and the viscosity of the initial 25°C. sample were measured at 25°C. using a Brookfield LVT, Helipath Stand, Spindle TE at 12 rpm.

| Rehydration Temperature | Viscosity (cps) 25°C. | 95–100°C. for 5 min. | Rehydration pH |
|---|---|---|---|
| Sample No. 09:125 | | | |
| at 5% W/W | 200 | 415 | |
| at 10% W/W | 1330 | 13,300 | 6.5 |
| at 20% W/W | > 84000 | > 84000 | |
| Sample No. 09:127C | | | |
| at 5% | < 166 | 580 | |
| at 10% | 9150 | 10800 | 6.2 |
| at 20% | > 84000 | > 84000 | |
| Sample No. 09:127B | | | |
| at 2.5% | < 166 | 380 | |
| at 5.0% | 166 | 2900 | 6.0 |
| at 10.0% | 21600 | > 84000 | |
| Sample No. 09:127A | | | |
| at 2.5% | < 166 | 540 | |
| at 5.0% | < 166 | 5800 | 5.8 |
| at 10.0% | 38000 | > 84000 | |
| Sample No. 09:126 | | | |
| at 5.0% | 330 | 330 | |
| at 10.0% | 3870 | 3860 | 6.0 |
| at 20.0% | > 84000 | > 86000 | |

Effect of Glycan Purity Upon Flavor and Functionality

Fifty gallons of a suspension of commercial baker's yeast at 12% solids, 40°F. was passed three times through a Manton-Gaulin homogenizer at 8000 PSIG with cooling at 45°F. The homogenate was diluted to 125 gal., adjusted to pH 9.5 with sodium hydroxide, agitated for fifteen minutes, and centrifuged to yield a cell wall sludge and an alkali extract. The cell wall sludge was diluted with an equal volume of water, cooled to 45°F., subjected to 0, 1, 2 and 3 passes through a Manton-Gaulin homogenizer at 8000 PSIG, 45°F., diluted with an equal volume of water, adjusted to pH 9.5 with sodium hydroxide, and centrifuged to give a "rehomogenized" cell wall sludge. The "rehomogenized" cell wall sludge was diluted with three volumes of water and centrifuged to give a once washed yeast glycan sludge. The washing process was repeated to give a twice washed yeast glycan sludge which was then adjusted to pH 5.2–5.5 with hydrochloric acid. Samples of the yeast glycan were removed for solids and viscosity measurements. The remainder of the glycan sludge was spray dried. The spray dried glycan was analyzed for crude protein content (Kjeldahl N×6.25), flavor, and viscosity.

| Number of rehomogenization passes | 0 | 1 | 2 | 3 |
|---|---|---|---|---|
| % Crude protein (dsb) | 22.1 | 20.7 | 16.1 | 10.6 |
| % Whole cells (by microscopic exam.) | 34 | 31 | 22 | 11 |
| Twice washed glycan sludge: | | | | |
| Solids content | 9.8 | 9.9 | 9.7 | 9.3 |
| Viscosity (cps), 25°C. | 1580 | 1860 | 2860 | 3640 |
| Spray dried glycan: | | | | |
| Solids content of resuspended glycan | 9.8 | 9.9 | 9.0 | 9.2 |
| Viscosity (cps), 25°C. | 3070 | 830 | 1990 | 6300 |
| Viscosity of a 10% suspension, 25°C. pH 6.5 | 3780 | 1500 | 3000 | 9500 |
| Flavor of 5% suspension | Yeasty | Yeasty | Not Yeasty | Not Yeasty |

The data of Table IX shows that the extent of purification affects the functionality and flavor of the glycan. Purification of the glycan was indicated by the decrease in the content of crude protein and of unfractured yeast cells. This probably means that the content of unbroken yeast cells were decreased by rehomogenization passes, which in turn allows yeasty flavor to be totally removed by washing.

Another beneficial effect was an increase in viscosity as the number of rehomogenization passes was increased. It is not clear if the increase in viscosity was due to a possible decrease in whole cell content, to a decreased content of protein, or simply to a possible decrease in particle size.

The equation representing the relationship between whole cells and crude proteins is:

% whole cells = 2×(% crude protein) − 10

There is a highly significant correlation ($r > 0.99$) between the whole cell content and the crude protein content. Extrapolation to zero % whole cells shows that the cell wall preparation free of whole cells contains 5.0% crude protein. Furthermore, extrapolation to 100% whole cells shows that the crude protein content of whole cells is 55%, which is in agreement with the value found for whole cells.

The data of Table IX shows that when the protein level is above about 20%, the flavor of the glycan suffers. Thus, the protein content is from about 5 to 20% and the content of whole cells is 0 to about 30%. With other method of cell rupture purification and drying, the protein content may fall within the foregoing range even though the whole cell content is at a very low level.

Comparison of the viscosities of the glycan sludge to that of the spray dried glycan reconstituted to the same solids content in Table IX shows that the act of spray drying can increase the viscosity.

If the glycan is freeze-dried instead of spray dried, the viscosity when reconstituted is reduced.

TABLE X

Comparison of the Viscosities of Freeze Dried and Spray Dried Glycan

Part of the glycan feed of Isolation No. 128 was freeze-dried and part spray dried. The freeze-dried and the spray dried powders were reconstituted to 10% W/W suspensions. The viscosity of the suspensions was measured at 25°C. after tempering for 0, 1, 2, 4, 24 hours at 25°C.

|  |  | Spray dried | Freeze-dried |
|---|---|---|---|
| Viscosity (cps) | 0 hrs. | 5000 | 0 |
|  | 1 | 6600 | 0 |
|  | 2 | 7700 | 0 |
|  | 4 | 8100 | 1000 |
|  | 24 | 9200 | 8500 |

The viscosity of freeze-dried glycan increases on long standing in aqueous suspension.

To be certain that the starting whole cells do not affect viscosity of aqueous systems, we have measured the viscosities of mixtures of spray dried glycan and spray dried whole cells. The results are shown in Table XI. The results are given in centipoises. The viscosity is measured at 25°C.

TABLE XI

| % Glycan | Whole Yeast Cells | Rehydration time at 25°C. HOURS | | | | |
|---|---|---|---|---|---|---|
|  |  | 0 | 1 | 2 | 4 | 24 |
| 100 | 0 | 1692 | 10192 | 13926 | 29120 | 33124 |
| 90 | 10 | 523 | 1765 | 5533 | 12522 | 20883 |
| 80 | 20 | 166 | 499 | 982 | 2144 | 8486 |
| 70 | 30 | 93 | 186 | 269 | 599 | 1555 |
| 0 | 100 | 56 | 93 | 63 | 67 | 67 |

The whole cells are spray dried unfractured baker's yeast. The yeast glycan is from baker's yeast and contains about 9.1% crude protein.

In addition to the aforementioned viscosity characteristics, suspensions of yeast glycan have additional important attributes such as a bland flavor, a "fat-like" mouth feel, and a sheen or gloss in appearance. By a "fat-like" mouth feel is meant that a material will impart a thick, oily sensation without a gummy or sticky sensation.

Furthermore, yeast glycan can serve as a source of energy. The bioavailability of the energy of a yeast glycan was measured at WARF Institute, Inc. according to a slightly modified procedure of E.E. Rice, Journ. of Nutrition, 61 (1957). The value of 3.52 calories per gram was obtained for a baker's yeast glycan made in accordance with Example No. 5. The Parr bomb calorimeter technique measured 3.70 calories per gram. The composition of the glycan was 7.9% moisture, 11.6% protein, 2.7% nucleic acid, 1.1% lipid, 7.0% ash, 9.9% crude fiber, and 59.1% carbohydrates. The biocaloric content of this yeast glycan is 3.83 calories per gram (dsb) as compared to sucrose at 3.85 calories per gram. The caloric content of the yeast glycan is about that of starch and protein, which is less than one-half that of fats and oils.

At the present time, at least 10 percent oil is required in even low-calorie products such as low calorie spoonable salad dressings, in order to obtain the "fat-like" mouth feel. We have found that the oil content of many food systems can be further reduced if yeast glycan is incorporated. Formulation of some of these systems are presented in Examples 6, 7, 8 and 9. The counterpart system is also presented.

EXAMPLE NO. 6

Chocolate Thick Shake

| Yeast Glycan Formula | | Counterpart |
|---|---|---|
| Ingredient | % W/W | |
| Liquid Skim Milk | 75 | A commercial preparation containing: water, corn syrup, sugar, hydrogenated coconut and palm kernel oils, NFMS, glycerol, sorbitol, cocoa processed with alkali, methylcellulose, carrageenan, dextrose, salt, mono-and diglycerides, polysorbate 65, guar gum, and natural and artificial flavors. Calories = 233 per 100 gram. |
| Granulated Sugar | 15 | |
| Yeast Glycan | 7 | |
| Breakfast Cocoa | 2 | |
| Vanilla | 1 | |
| Calories | 115/100 grams | |

Separately blend the dry and wet ingredients. Add the dry mix to the wet, increasing the mixer speed as necessary. Mix for three minutes. Chill or freeze.

EXAMPLE NO. 7

Chocolate Instant Pudding

| Yeast Glycan Formula | | Counterpart |
|---|---|---|
| Ingredient | % W/W | |
| Liquid Skim Milk | 73 | A commercial preparation containing: water, sugar, NFMS, whey solids with |
| Granulated Sugar | 14 | |

-Continued

Chocolate Instant Pudding

| Yeast Glycan Formula | | Counterpart |
|---|---|---|
| Ingredient | % W/W | |
| Yeast Glycan | 10 | calcium hydroxide and disodium phosphate, modified tapioca starch, hydrogenated vegetable oil, cocoa processed with alkali, sodium stearoyl -2-lactylate, polysorbate 60, sorbitan monostearate, sodium caseinate, salt, dextrose, carrageenan, guar gum, artificial color and flavor. 150 calories/100 gram. |
| Breakfast Cocoa | 2 | |
| Vanilla | 1 | |
| Calories | 93/100 grams | |

Procedure:
Separately blend the dry and wet ingredients. Add the dry mix to the wet and continue to mix at medium speed until the pudding begins to thicken. Chill for serving.

The flavor, mouthfeel, texture and appearance of the chocolate instant pudding formulated with yeast glycan was directly comparable to the commercial product.

EXAMPLE NO. 8

Thousand Island Salad Dressing

| Yeast Glycan Formula | | Counterpart |
|---|---|---|
| Ingredients | % W/W | |
| Water | 52.4 | A commercial low calorie preparation containing: water, vinegar, soybean oil, sugar, tomato paste, pickle, egg yolk, salt, lemon juice, onion, gum tragacanth, flavoring, red peppers, propylene glycol, alginate, spices, artificial color, calcium disodium EDTA. 168 calories/100 grams. |
| Chili Sauce | 20.0 | |
| Pickle Relish | 10.0 | |
| Vegetable Oil | 6.8 | |
| Yeast Glycan | 5.4 | |
| Egg yolk | 2.0 | |
| White vinegar (5 grain) | 2.0 | |
| Sucrose | 1.4 | |
| Calories | 126/100 grams | |

Procedure for Yeast Glycan Formula:
1. Place the water and oil in a blender. Set the blender at the lowest speed. Add the yeast glycan. After the yeast glycan is dispersed gradually increase the blender speed until the yeast glycan, oil and water set up to a creamy, thick texture.
2. Add pickle relish, chili sauce and egg yolk to yeast gum base. Blend well. Chill for serving.

The flavor, mouthfeel, texture and appearance of the Thousand Island Salad Dressing formulated with yeast glycan was directly comparable to the commercial product.

EXAMPLE NO. 9

Sour Cream Type Dip

| yeast Glycan Formula | | Counterpart |
|---|---|---|
| Ingredient | % W/W | |
| Liquid Buttermilk | 90.0 | A conventional sour cream dip (cookbook recipe) |

Sour Cream Type Dip

| yeast Glycan Formula | | Counterpart |
|---|---|---|
| Ingredient | % W/W | |
| Yeast Glycan | 9.0 | is made with sour cream to which onion and flavorings are added. |
| Rogers Toasted Onion | 0.5 | |
| Monosodium Glutamate | 0.2 | A typical recipe is: |
| Basic Vegetable "Fresh Flavor" | 0.2 | Sour cream ½ pint |
| Onion | 0.1 | Onion and Flavorings ¾ ounces |
| Citric Acid Monohydrate | 0.2 | Calories 180/100 grams |
| Calories | 66/100 grams | |

Procedure:
Using an electric mixer, blend the dry ingredients into the buttermilk. Chill, garnish with chives.

The flavor, mouthfeel, texture, and appearance of the sour cream type dip formulated with yeast glycan was directly comparable to the commercial product.

EXAMPLE NO. 10

Imitation Mayonnaise (low calorie)

| Ingredients | % W/W | Counterpart |
|---|---|---|
| A. | | |
| Vinegar | 6.0 | A commercial low calorie limitation mayonnaise containing: water, vegetable oil; starch, vinegar, salt, egg yolks, saccharin, sodium benzoate, EDTA, flavorings and color. |
| Lemon juice | 2.0 | |
| Salt | 1.5 | |
| Mustard | 0.25 | |
| Onion | 0.025 | |
| Garlic | 0.025 | |
| Saccharin | 0.020 | |
| Water | 68.68 | |
| B. | | |
| Vegetable oil | 10.0 | |
| Egg yolk | 4.0 | 136 calories/100 grams |
| Yeast glycan | 7.5 | |
| Calories 102/100 grams | | |

Procedure:
1. Place ingredients in Part A in a blender. Set blender at low speed. Mix to form a slurry.
2. Add oil and egg yolk and mix well at high speed.
3. Set blender at high speed and mix in yeast glycan.
4. Continue mixing at high speed, until contents set to a soft gel.
5. Homogenize mixture for further smoothness.

What is claimed is:
1. A yeast product comprising yeast fragments and whole cells containing on a dry solids basis from about 5 to about 20% crude protein, from about 0.1 to about 3 percent nucleic acid, from about 0.1 to about 3 percent lipid, from about 0.5 to about 3 percent ash, and from about 60 to about 95 percent carbohydrate, and having a minimum viscosity of 500 centipoise when suspended in a 10 percent aqueous suspension, said product having a majority of irregular cell wall fragments and having a minor amount of whole cells.
2. A product according to claim 1 having greater than 3,500 centipoise in said 10 percent suspension.

3. A product according to claim 1 derived from *Saccharomyces cerevisiae*, *Saccharomyces carlsbergensis*, *Saccharomyces fragilis*, and *Candida utilis*.

4. A process for the production of yeast glycan comprising the steps of:
   A. Growing a food grade yeast,
   B. Harvesting and washing the yeast biomass,
   C. Rupturing the yeast cells,
   D. Extracting the ruptured yeast cells at a pH of 5.5 to 11 for up to about 60 minutes,
   E. Separating the insoluble glycan from soluble cytoplasmic materials, and
   F. Recovering a yeast glycan product having a major amount of irregular cell wall fragments and a minor amount of whole cells.

5. The process of claim 4 including the step of
   A. Washing the recovered glycan with water,
   B. Concentrating the glycan, and
   C. Drying the glycan to recover a product containing on a dry solids basis from 5 to 20% crude protein, from 0.1 to 3% nucleic acid, from 0.1 to 3% lipid, from 0.5 to 3% ash, and from 60 to 95% carbohydrate.

6. A process according to claim 5 wherein the viscosity of the glycan is increased by incubating at pH 9.5 prior to drying.

7. A process according to claim 5 wherein the glycan is spray dried.

8. A process according to claim 4 in which the yeast is selected from the group consisting of *Saccharomyces cerevisiae*, *Saccharomyces carlsbergensis*, *Saccharomyces fragilis*, and *Candida utilis*.

9. A process according to claim 4 wherein the yeast cells are ruptured by homogenization below about 50°C.

10. A process according to claim 4 wherein the ruptured yeast cells are extracted as a pH between about 6 and about 11 and a temperature between about 25° and about 60°C. for about 5 to abaout 60 minutes.

11. A process according to claim 4 wherein the ruptured yeast cells are extracted at a pH of about 9.5 and a temperature between 25°C. and 60°C. for 5 to 60 minutes.

12. The process according to claim 4 wherein the insoluble glycan is separated by centrifugation.

13. A process according to claim 5 wherein the protein content of the glycan is reduced to a constant amount by repeated aqueous washings.

14. A process according to claim 4 wherein the protein content of the glycan is reduced by homogenization and aqueous washing prior to recovery of the glycan.

15. A process according to claim 4 including the steps of:
   A. Homogenizing the separated glycan,
   B. Washing the homogenized glycan with water, and
   C. Drying the glycan to recover a product containing on a dry solids basis from 5 to 20% crude protein, from 0.1 to 3% nucleic acid, from 0.1 to 3% lipid, from 0.5 to 3% ash, and from 60 to 95% carbohydrate.

16. The process of claim 4 including the step of rehydrating the separated insoluble glycan and holding the same for about 3 to about 30 hours at a pH of about 8.5 to about 10 and a temperature of about 40°F. to about 122°F.

* * * * *